S. E. WINDER.
GLASS BOTTLE MACHINE.
APPLICATION FILED NOV. 2, 1910.
998,824.
Patented July 25, 1911.
3 SHEETS—SHEET 1.
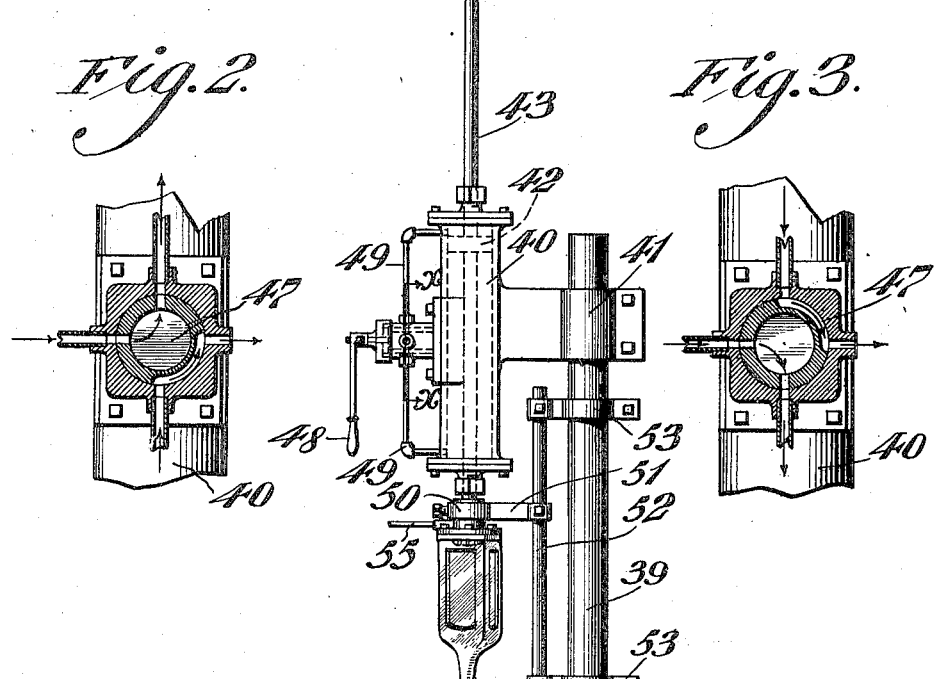
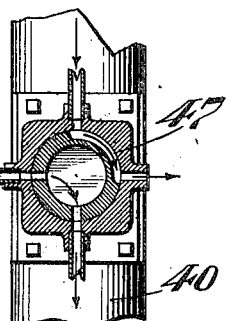
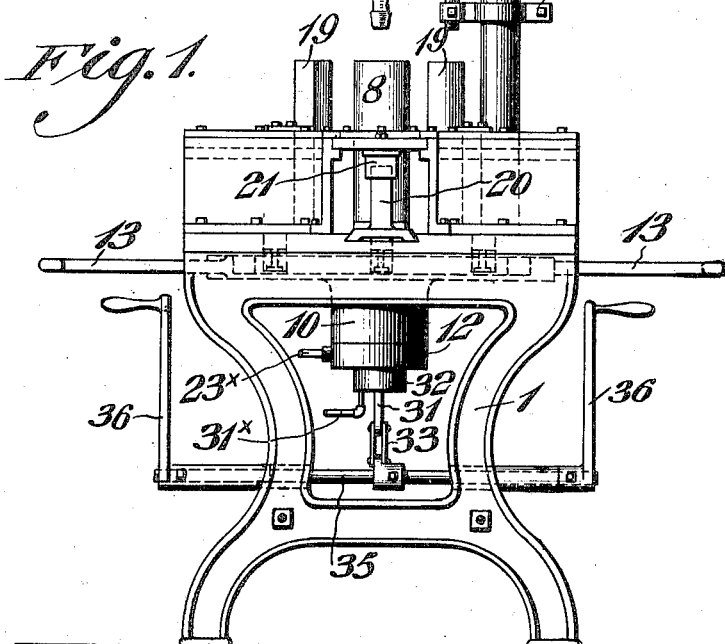
WITNESSES
INVENTOR
Samuel E. Winder
BY Wiedersheim & Fairbanks
ATTORNEYS S. E. WINDER.
GLASS BOTTLE MACHINE.
APPLICATION FILED NOV. 2, 1910.
998,824.
Patented July 25, 1911.
3 SHEETS—SHEET 2.
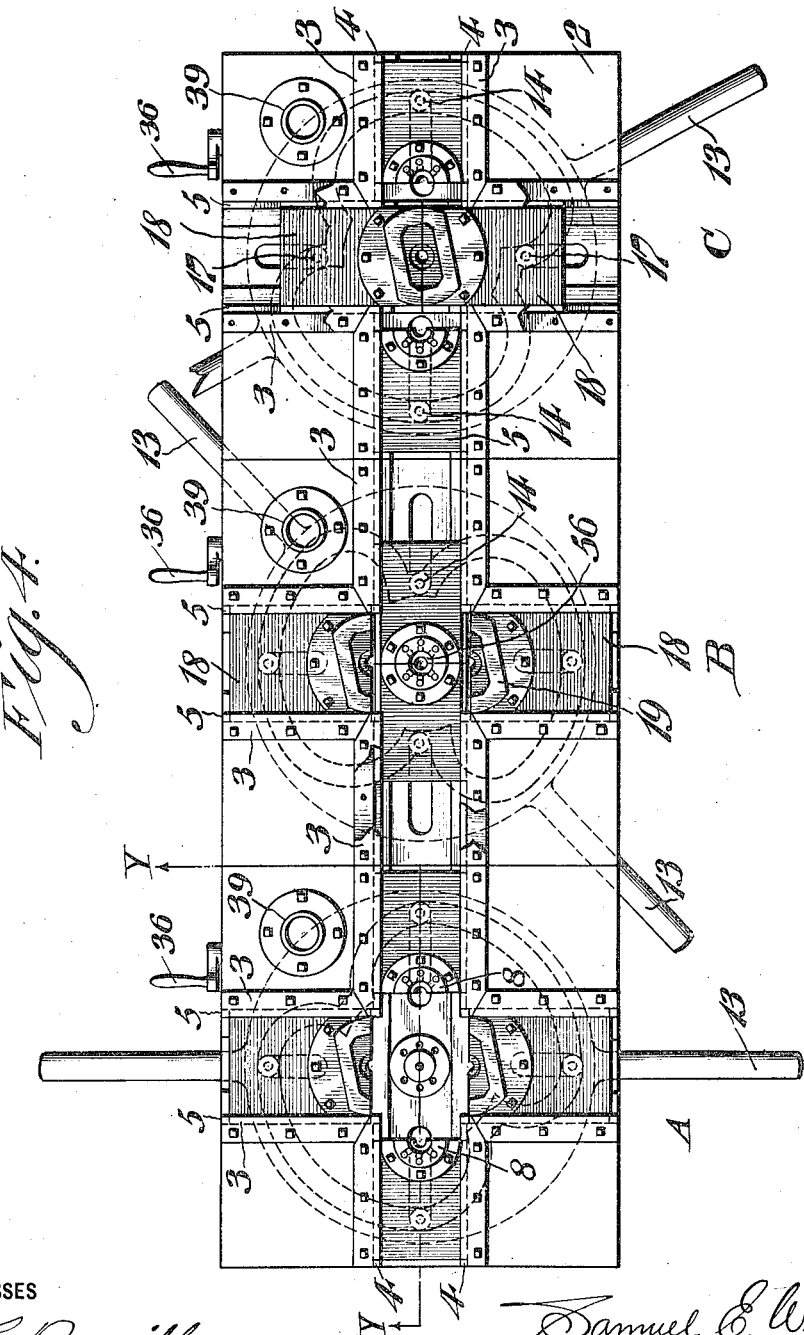
WITNESSES
INVENTOR
Samuel E. Winder.
BY Wiedersheim & Fairbanks,
ATTORNEYS S. E. WINDER.
GLASS BOTTLE MACHINE.
APPLICATION FILED NOV. 2, 1910.
998,824.
Patented July 25, 1911.
3 SHEETS—SHEET 3.
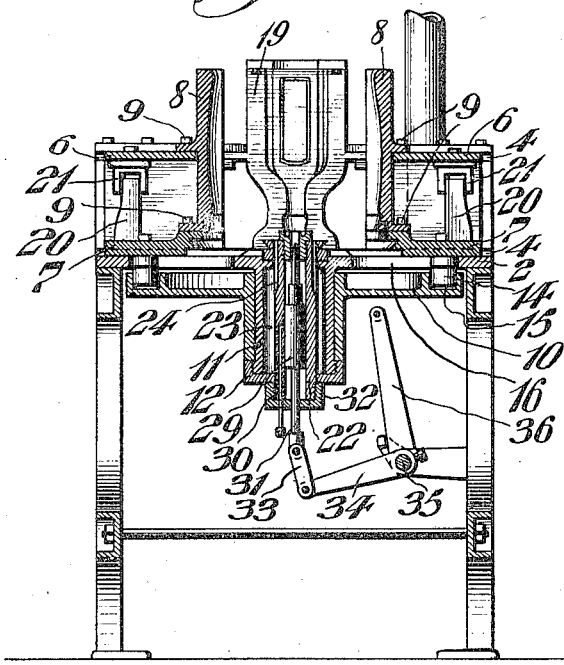
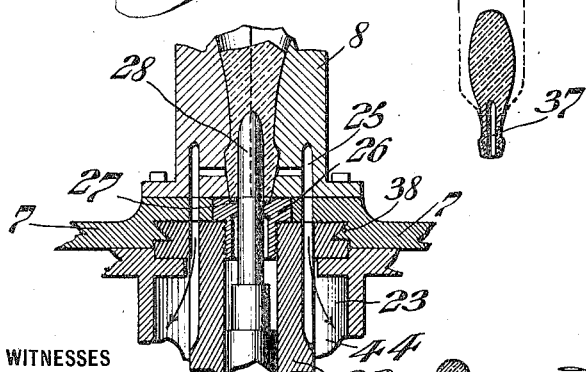
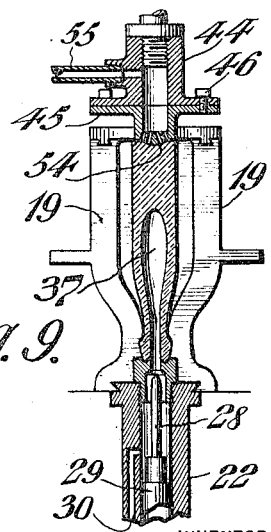
WITNESSES
INVENTOR
Samuel E. Winder
BY Wiedersheim & Fairbanks
ATTORNEYS ized thereon the top and bottom plates 75

UNITED STATES PATENT OFFICE.

SAMUEL E. WINDER, OF SALEM, NEW JERSEY, ASSIGNOR TO APPLETON P. WILLIAMS, TRUSTEE, OF WEST UPTON, MASSACHUSETTS.

GLASS-BOTTLE MACHINE.

998,824.      Specification of Letters Patent.      Patented July 25, 1911.

Application filed November 2, 1910. Serial No. 590,259.

*To all whom it may concern:*

Be it known that I, SAMUEL E. WINDER, a citizen of the United States, residing at Salem, in the county of Salem, State of New Jersey, have invented a new and useful Glass-Bottle Machine, of which the following is a specification.

This invention relates to a novel means or apparatus for forming or manufacturing articles of glass and relates more particularly to bottle making, whereby a suitable blank may be molded and blown into a bottle without necessitating the removal of the blank from the machine previous to the blowing operation.

It further consists of a novel supporting and retaining means for a blank during the process of molding and blowing, whereby a uniformly shaped article may be produced and the disadvantages, due to expansion and contraction heretofore present, may be eliminated.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents an elevation of a machine embodying my invention. Fig. 2 represents a section on line *x—x*, Fig. 1. Fig. 3 represents a similar section showing the valve in another position. Fig. 4 represents a plan of the bed of the machine. Fig. 5 represents a section on line *y—y*, Fig. 4. Fig. 6 represents a section showing a detail of the bottle neck forming means. Fig. 7 represents the blank after the press or forming molds have engaged the same. Fig. 8 represents the same after the blow opening has been formed. Fig. 9 represents a section showing the blank in position in the blow mold.

Similar numerals of reference indicate corresponding parts in the figures.
Referring to the drawings: 1 designates the main frame of a bottle making machine, comprising my invention, the same having a bed plate 2 secured thereto and in the present instance of sufficient size to accommodate several forming machines, A, B and C, so that one after the other may be operated to produce bottle after bottle and without loss of time. The bed plate 2 has secured thereto a plurality of angular standards 3 having guides 4 and 5 therein forming ways for respective molding and forming mechanism, presently to be described. These guides 4 and 5 are preferably arranged at right angles to each other so that one set of molding devices may be moved into operative position and then drawn back to permit the other set to be moved up and perform the step for which they are intended. The guides 4, as here shown, have slidingly mounted thereon the top and bottom plates 6 and 7 of the blank mold 8, to which they are attached by any suitable fastening means, as the bolts 9. These blank molds are moved backward and forward, in the present instance, by means of a disk 10 rotatably mounted on a hub 11 of the bed plate 2 and held in operative position by means of a collar 12 suitably threaded to the said hub 11, movement of the disk 10 being obtained through the medium of hand levers 13, preferably integral with each disk and projecting at opposite sides of the frame 1 so that operation of the mechanism may be had from either side of the machine. The rotary movement of the disk 10 is transmitted to the respective blank molds 8 through the medium of a roller 14, suitably secured to the base plate 7 and positioned within a cam groove 15 of the disk 10.

It will of course be understood that the bed plate 2 is provided with a slot 16 to permit proper sliding movement of the roller 14 and its adjuncts. The contour of the cam groove 15 will be readily apparent by referring to Fig. 4 of the drawing and it is so designed as to simultaneously shift the respective blank molds toward or away from each other. In the present instance this groove 15 is a continuous one and in the portion adjacent the guide ways 5 receives a roller 17 suitably secured to each press or blow mold plate 18 in order that these members may also be moved in a desired manner. These plates 18 each carry a section 19 of the blow mold or finishing mold and are reciprocated in a similar manner to that described for the blank molds but operate reversely therefrom, that is to say, at the time the blank molds are being advanced to closed position to receive a "gather" of glass, the blow mold sections are each being withdrawn. In connection with the movement of the respective mold supporting plates 7, it will be noted that movement is transmitted to the upper guide plate 6 through the medium of a lug 20 suitably positioned in engagement with a channel member 21 suitably secured to the plate 6 and thereby affording a means to prevent outward play of the mold at the top and insure the several parts being correctly alined.

22 designates a sleeve suitably mounted on the bed plate 2 and substantially in alinement with the intersection of the axis of the respective guide ways 4 and 5, so that when the "gather" of glass is positioned within the closed mold sections, it will be in direct alinement with the axis of the sleeve 22. In connection with this sleeve 22 it will be noted that a space 23 is formed between it and the hub 11 and serves as a passage way with which a suitable vacuum apparatus is connected by way of the pipe 23ˣ. Suitable ports 24 are formed adjacent one end of the sleeve 22 and communicate at one end with the space 23, while at the opposite end they are in alinement with the ports 25 formed in the blank mold sections 8 and whereby a suction may be produced to firmly seat the glass within the neck forming portion of the blank mold.

26 designates a bushing preferably screw-threaded into the end of the sleeve 22 and having a portion 27 cut away to receive and form the mouth of the bottle. Through this bushing 26 a plunger 28 is adapted to pass and be properly guided thereby for engagement with the "gather" located in the blank mold and by which it is apertured to form a channel for the air to enter and blow the glass into proper shape. The plunger 28 has a piston 29 secured thereto and which is slidingly mounted within the sleeve 22, the said piston forming a valve to open and close an air port 30, here shown as formed in the sleeve 22 and supplied with air from any suitable source, as the pipe 31ˣ. The stem 31 of the plunger 28 projects, in the present instance, through a cap 32 secured to the sleeve 22 and is operatively connected by a link 33 to a lever 34 fixedly secured to a rock shaft 35, the latter being operated by hand levers 36 at either side of the machine. It will thus be apparent that movement of the rock shaft 35 will cause a shifting of the plunger 28, the first function of which is to punch the opening 37 in the "gather" of glass and the second movement of which lowers the piston 29 so that air may enter by way of the port 30 and perform the blowing operation. It will be noted that the sleeve 22 is suitably recessed to form a joint 38 with the abutting mold section in order to prevent leakage of air therebetween.

39 designates a standard suitably secured to the bed 2 and positioned adjacent each molding mechanism and serving as a support for the mechanism which carries the "gather" of glass and the finished article. This mechanism consists, in the present instance, of a cylinder 40 adjustably carried by a bracket 41 attached to the standard 39 and carrying therein a piston 42 mounted on the piston rod 43. This rod 43 is adapted to project through each end of the cylinder 40 and carries on one end a hollow head 44 to which the former 45 for the bottom of the bottle is secured by suitable bolts 46 or like fastening devices. The piston 42 is actuated preferably by compressed air, although of course steam or like fluid pressure may be used, the operation thereof being controlled by a rotary valve 47 controlled by the hand lever 48, suitable conduits 49 being connected at either end of the cylinder and the operation of which will be perfectly obvious.

50 designates a suitable ring clamp adapted to be secured to the head 44 and having a bracket 51 secured thereto, which latter is mounted for sliding movement upon a bar 52 suitably secured by clamps 53 to the standard 39, the function of the ring 50 being to firmly hold the head and its adjuncts when lowered into proximity to the molding mechanism. The former 45 is provided with a plurality of ports 54 communicating with the interior of the head 44, while an outlet 55 is secured to this head and leads to a suitable air pump or the like, whereby the air may be exhausted from the interior of the former and a vacuum produced, which holds the bottle firmly suspended, as shown in Fig. 1 of the drawings. This feature of supporting the bottle from the bottom forms an essential feature of my novel construction, since heretofore in the art it has been customary to support the bottles during the process of manufacture, entirely by the neck. This neck method of supporting and forming a bottle has been found in practice unsatisfactory, since thereby the expansion and contraction of the glass, due to exposure to air currents, has caused irregularities in the conformation of the finished bottle so that an imperfectly formed bottle is the result. By holding the bottle at the bottom the larger surface exposed to the supporting means resists this expansion and contraction and prevents distortion of the bottle.

In Fig. 9 the glass is shown hanging from the bottom former 45, being supported thereon by suction, while it is incased by the blow mold ready to be blown into a bottle of the desired shape. This figure also illustrates the opening 37 made by the plunger 28 to convey the compressed air into the blank for proper blowing action.

In the operation of the device a "gather" of glass is inserted through the opening 56 of the blank mold, which is closed, as shown in mechanism B of Fig. 4, and in its molten condition conforms to the shape of the neck mold and rests upon the bushing 26. Immediately the air is exhausted from the space 23 and draws the blank tightly against the bushing and holds the same firmly in position, as shown in Fig. 6. At this time the lever 36 is shifted to move the plunger 28 the required distance into the blank and form the opening 37 ready to receive compressed air for molding the blank into the finished article, it being noted that the vacuum produced in the ports 25 holds the blank seated during this operation and prevents it being pressed away or other than a straight bore being made. As soon as this step has been completed the operator moves to the next molding apparatus, as A, and places therein another "gather" of glass for another bottle, while a second operator on the machine B grasps the lever 48 and turns valve 47 to admit pressure fluid above piston 42, whereby the head 44 is lowered and the former 45 brought into contact with the bottom of the blank. The lever 13 is now shifted to withdraw the blank molds and to simultaneously bring the pressing or finishing molds 19 into position, as shown in machine C of Fig. 4. As soon as this mold is closed, air is admitted into the sleeve 22 by moving the lever 36 to lower the piston valve 29 to open port 30 and the blowing process takes place. During this step of forming, the bottle blank is supported upon the former 45, owing to the vacuum therein and when completely blown the lever 48 is turned to admit pressure fluid beneath piston 42 to raise the rod 43 to the position shown in Fig. 1, whereupon the bottle may be readily removed, since the strength of the vacuum holding means is but slightly in excess of the weight of the article. It will thus be apparent that a complete bottle is formed by the one machine without withdrawing it therefrom during the operation and one operator follows another, each performing certain parts of the operation, there being no delay or loss of time, since one machine is being filled while another is molding and still another is finishing. The levers 13 projecting on either side, make it possible to control the movements of the molds as desired and from any position.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a machine of the character stated, the combination of a plurality of mold sections, with a bottom former, and means to support a bottle blank on said bottom former.

2. In a machine of the character stated, the combination of a plurality of mold sections, with a bottom former having ports therein, and means to produce a partial vacuum in said former, whereby a bottle blank is suspended therefrom.

3. In a machine of the character stated, the combination of a blank mold with a blow mold, a bottom former adjacent thereto, suction controlled means to support a bottle blank on said former, and means to operate said molds successively to engage said blank.

4. In a machine of the character stated, a frame, a plurality of blank mold sections slidingly mounted thereon, a plurality of blow mold sections angularly disposed with relation thereto and slidingly mounted, means to operate said mold sections, a bottle neck support, a plunger adapted to pass therethrough, means to operate said plunger, and suction controlled means to suspend a bottle blank in inverted position.

5. In a machine of the character stated, a frame, a plurality of blank mold sections slidingly mounted thereon, a plurality of blow mold sections angularly disposed with relation thereto and slidingly mounted, means to operate said mold sections, a bottle neck support, suction means operating in conjunction therewith to hold a bottle blank, a plunger adapted to pass through said support, means to operate said plunger, and suction controlled means coöperating with the blank bottom to suspend said blank in operative position.

6. In a machine of the character stated, a frame, a plurality of blank mold sections slidingly mounted thereon, a plurality of blow mold sections angularly disposed with relation thereto and slidingly mounted, means to operate said mold sections, a bottle neck support, suction means operating in conjunction therewith to hold a bottle blank, a plunger adapted to pass through said support, means to operate said plunger, suction controlled means coöperating with the blank bottom to suspend said blank in operative position, and means to introduce pressure fluid into said bottle blank.

7. In a machine of the character stated, a frame, a plurality of blank mold sections slidingly mounted thereon, a plurality of blow mold sections angularly disposed with relation thereto and slidingly mounted, means to operate said mold sections, a bottle neck support, suction means operating in conjunction therewith to hold a bottle blank, a plunger adapted to pass through said support, means to operate said plunger, suction controlled means coöperating with the blank bottom to suspend said blank in operative position, and a valve carried by said plunger and adapted to control the admission of pressure fluid to said bottle blank.

SAMUEL E. WINDER.

Witnesses:
 FRANK CROW,
 NELLIE WINDER.